United States Patent
Taguchi et al.

(10) Patent No.: US 7,339,372 B2
(45) Date of Patent: Mar. 4, 2008

(54) ROTATION DETECTING SENSOR

(75) Inventors: Kenichi Taguchi, Toyota (JP); Takashi Hara, Ichinomiya (JP); Hidenobu Muramatsu, Anjo (JP); Kazuhiro Kamiya, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 11/729,867

(22) Filed: Mar. 30, 2007

(65) Prior Publication Data

US 2007/0229060 A1 Oct. 4, 2007

(30) Foreign Application Priority Data

Mar. 30, 2006 (JP) ............................ 2006-094809

(51) Int. Cl.
*G01B 7/30* (2006.01)

(52) U.S. Cl. .................... 324/207.25; 73/514.39

(58) Field of Classification Search ........... 324/207.25, 324/207.2, 251; 73/514.31, 514.39, 514.16
See application file for complete search history.

(56) References Cited

U.S. PATENT DOCUMENTS

| 6,452,381 B1* | 9/2002 | Nakatani et al. ....... 324/207.21 |
| 2005/0225321 A1* | 10/2005 | Kurumado ............. 324/207.21 |
| 2006/0028203 A1* | 2/2006 | Kawashima et al. ... 324/207.25 |

FOREIGN PATENT DOCUMENTS

| JP | 10-132836 A | 5/1998 |
| JP | 10-318784 A | 12/1998 |
| JP | 2004-177336 A | 6/2004 |

* cited by examiner

*Primary Examiner*—Bot LeDynh
(74) *Attorney, Agent, or Firm*—Sughrue Mion, PLLC

(57) ABSTRACT

A rotation detecting sensor includes a magnetic element group include at least three magnetic elements each of which detects rotations of a rotary body that includes a magnetic body, output portions each for outputting a signal generated at each of the magnetic elements to an outside, and element selecting means for selecting arbitrary two magnetic elements from the magnetic element group and applying the generated signal to the two output portions.

7 Claims, 2 Drawing Sheets

ROTATION DETECTING SENSOR

CROSS REFERENCE TO RELATED APPLICATIONS

This application is based on and claims priority under 35 U.S.C. § 119 to Japanese Patent Application No. 2006-094809, filed on Mar. 30, 2006, the entire content of which is incorporated herein by reference.

FIELD OF THE INVENTION

This invention generally relates to a rotation detecting sensor. More particularly, this invention pertains to a rotation detecting sensor including a magnetic element for detecting rotations of a rotary body that includes a magnetic body, and an output portion for outputting a signal generated at the magnetic element to the outside.

BACKGROUND

A known rotation detecting sensor for detecting rotations of a rotary body (hereinafter referred to as a "rotor") that includes a magnetic body is disclosed in JP10-318784A and JP2004-177336A. The rotor disclosed forms into the magnetic body having tooth portions (i.e., protruding and recess portions) arranged at predetermined intervals on an outer circumferential surface, for example. The rotation detecting sensor disclosed includes a pair of magnetic elements arranged so as to face the outer circumferential surface of the rotor. The magnetic elements detect rotations of the rotor by detecting a change in magnetic flux that is generated when the protruding and recess portions of the rotor repeatedly approach to, or separate from, the magnetic elements.

In the cases where the pair of magnetic elements is arranged in a direction along the rotation direction of the rotor, signals acquired from the respective magnetic elements are prevented from synchronizing with each other over time. The detected differential between the signals at this time can be used for detecting the rotation speed direction, and the like.

According to the aforementioned rotation detecting sensor, it is important to arrange the pair of magnetic elements in the direction substantially along the rotation direction of the rotor.

For example, in the cases where the rotation detecting sensor is mounted in a specific position or portion in a vehicle, it is required to adjust an angle of the sensor upon mounting, or to manufacture the sensor so as to have a mounting portion suitable for a shape of the portion where the sensor is mounted.

If the pair of magnetic elements are arranged, deviating from the rotation direction of the rotor because of a restriction of the position where the rotation detecting sensor is mounted, a distance between one of the magnetic elements and the rotor, and a distance between the other one of the magnetic elements and the rotor may be significantly different from each other as compared to a case where the pair of magnetic elements are appropriately arranged. In this case, it may be difficult to precisely detect the differential between signals from the respective magnetic elements. Accordingly, the position where the rotation detecting sensor is mounted is restricted because of a requirement of a specific orientation of the magnetic elements.

Normally, the rotation detecting sensors are used in various places in a vehicle for the use of an engine control, an ABS control, and the like. In this case, various and multiple types of rotation detecting sensors are required so as to be suitable for each shape of the portion where the rotation detecting sensor is mounted. That is, multiple types of rotation detecting sensors are present for one vehicle, which leads to a complicated parts control and cost increase.

Thus, a need exists for a rotation detecting sensor that can be mounted in various positions or portions.

SUMMARY OF THE INVENTION

According to an aspect of the present invention, a rotation detecting sensor includes a magnetic element group including at least three magnetic elements each of which detects rotations of a rotary body that includes a magnetic body, output portions each for outputting a signal generated at each of the magnetic elements to an outside, and element selecting means for selecting arbitrary two magnetic elements from the magnetic element group and applying the generated signal to the two output portions.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
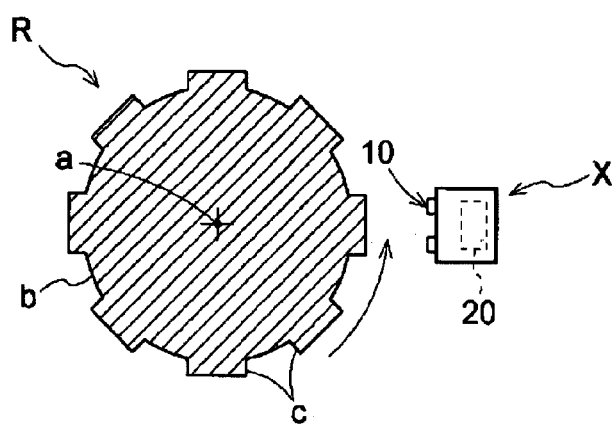
FIG. 1 is a view illustrating a rotation detecting sensor arranged so as to face a rotor according to an embodiment of the present invention.
Figure 2A:
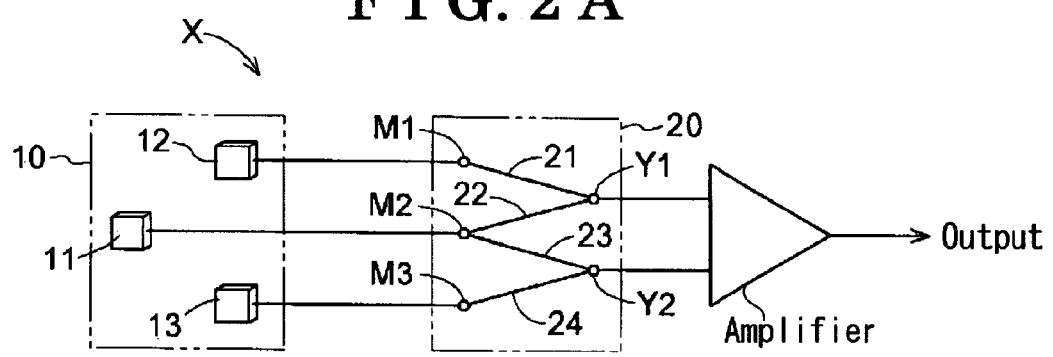
FIGS. 2A and 2B are schematic diagrams of the rotation detecting sensor according to the embodiment of the present invention.
Figure 2B:
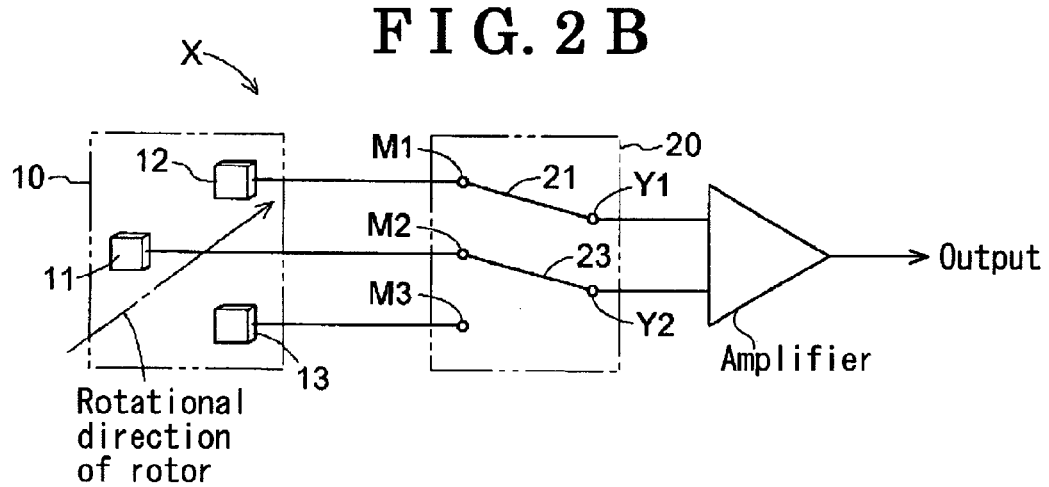

An embodiment of the present invention will be explained with reference to the attached drawings. The embodiment of the present invention is a rotation detecting sensor that detects rotations of a rotor including a magnetic body. For example, the rotation detecting sensor is used for an engine control of a vehicle, an ABS control for braking of a vehicle, and the like. Precisely, the rotation detecting sensor is mounted on an axle for detecting rotations of a wheel (i.e., rotor), for example. FIG. 1 is a view illustrating a rotation detecting sensor X arranged so as to face a rotor. FIGS. 2A and 2B are schematic diagrams of the rotation detecting sensor X.

The rotation detecting sensor X, which is arranged so as to face a rotor R, includes a magnetic element group 10 constituted by a first magnetic elements 11, a second magnetic elements 12, and a third magnetic elements 13. The rotation detecting sensor X further includes an element selector (element selecting means) 20 for selecting arbitrary two magnetic elements from the magnetic element group 10 and applying signals generated at the selected magnetic elements to two output terminals (i.e., output portions) Y1 and Y2, respectively, as illustrated in FIG. 2A.

The rotor R is configured so as to include a magnetic body. The rotor R according to the present embodiment forms into a disc that is made up of the magnetic body such as a steel plate and rotates about a center a as illustrated in FIG. 1. Then, tooth portions (i.e., protruding and recess portions) c are formed at predetermined intervals on an outer circumferential surface b of the rotor R. The rotations of the rotor R are detected through a detection of change in magnetic flux generated when the tooth portions c repeatedly approach to or separate from the magnetic elements. The rotor R may be a magnet rotor including a magnet with north poles and south poles alternately arranged in a circumferential direction, instead of the tooth portions c.

The magnetic element group 10 can have any numbers of magnetic elements, but must have three, arranged so as to face the outer circumferential surface b of the rotor R. Each of the magnetic elements 11, 12, and 13 operates so as to detect a magnitude of the magnetic flux passing through the rotation detecting sensor X and generates an output signal representing the magnitude of the detected magnetic flux. For example, a Hall IC can be used as the magnetic element.

The reason for selecting two magnetic elements out of three magnetic elements 11 to 13 is as follows. The rotation detecting sensor X detects, by means of the magnetic elements, the change in magnetic flux depending on the shape of the tooth portions c formed at the rotor R, which is a detection object, for the purpose of detecting the rotations of the rotor R. Thus, even if the rotation detecting sensor X includes only one magnetic element, the rotations of the rotor R can be detected. However, in this case, a possible noise that may be also detected by the magnetic element such as electromagnetic wave generated by a peripheral device of the rotation detecting sensor X is difficult to be distinguished from the magnetic flux from the rotor R. On the other hand, in the cases where the rotation detecting sensor X includes two magnetic elements, even if the magnetic elements detect the aforementioned noise, the noise can be detected through the output signals of the two magnetic elements, respectively and simultaneously, thereby simplifying a discrimination and elimination of the noise. Further, when the two magnetic elements are provided, the signals acquired by the respective magnetic elements are prevented from synchronizing with each other over time. The differential of the signals output at this time can be used for detecting the rotation speed and direction of the rotor R, accordingly.

In the cases where two magnetic elements are selectable out of three magnetic elements 11 to 13, arbitrary two magnetic elements suitable for a specific position where the rotation detecting sensor X is mounted can be chosen as illustrated in FIG. 2B. The selected two magnetic elements are connected to two output terminals Y1 and Y2, respectively. Since the differential between the output signals from the respective selected two magnetic elements are the largest among three magnetic elements, the rotation detecting sensor X can most precisely detect the rotations of the rotor R.

The magnetic element group 10 is constituted in such a way to include the magnetic elements arranged at least in a triangular shape. That is, three magnetic elements are defined to be arranged in a polygon shape instead of a linear shape. According to the present embodiment, the magnetic elements 11 to 13 are arranged in an equilateral triangular shape. At this time, a mounting space of the magnetic elements is the smallest, thereby maximally reducing a size of the rotation detecting sensor X.

In the rotation detecting sensor X, it is important to arrange the pair of magnetic elements in a direction substantially along the rotation direction of the rotor R. If the magnetic elements 11 to 13 are linearly arranged, any selected pairs of magnetic elements are always, i.e., in three possible cases, oriented in the same directions. In this case, if the direction in which the selected magnetic elements are arranged and the rotation direction of the rotor R are significantly different from each other, an accurate detection of the differential between the signals output from the respective selected magnetic elements may be difficult in any three possible cases where the pair of magnetic elements are selected. However, when the magnetic elements 11 to 13 are arranged at least in the triangular shape as in the present embodiment, the orientations of the selected pairs of magnetic elements are different from each other in any possible cases where the magnetic elements are selected. Accordingly, the selection of the pair of magnetic elements that are arranged in the closest direction along the rotation direction of the rotor can help the accurate detection of the differential between the signals from the selected magnetic elements, respectively.

If an angle formed between a direction in which the magnetic elements 11 and 12 are arranged and the rotation direction of the rotor R, and an angle formed between a direction in which the magnetic elements 11 and 13 are arranged and the rotation direction of the rotor R are same as each other, for example, either pair can be selected.

Further, in the cases where the magnetic element group 10 includes four or more of the magnetic elements, the magnetic elements can be arranged in the polygon shape so that, in any possible cases where the pair of magnetic elements is selected, the orientations of the pairs of magnetic elements can be different from each other. Especially, possibility of the orientations of the pairs of magnetic elements can be greater when the number of magnetic elements is increased. Thus, the pair of magnetic elements that are arranged in the closest direction along the rotation direction of the rotor R can be appropriately selected, thereby supporting the accurate detection of the differential between the signals from the respective selected magnetic elements as much as possible.

The element selector 20 is constituted by wirings including cut portions as illustrated in FIGS. 2A and 2B. The first magnetic element 11, the second magnetic element 12, and the third magnetic element 13 are connected to the output terminals Y1 and Y2 by means of terminals (i.e., monitor terminals) M1, M2, and M3, respectively. At this time, the terminal M1 and the output terminal Y1 are connected to each other by means of a first wire 21. In the same way, the terminal M2 and the output terminal Y1 are connected to each other by means of a second wire 22. The terminal M2 and the output terminal Y2 are connected to each other by means of a third wire 23. The terminal M3 and the output terminal Y2 are connected to each other by means of a fourth wire 24. Accordingly, the arbitrary two magnetic elements are selectable.

As mentioned above, each of the magnetic elements 11 to 13 is connected to at least one of the two output terminals Y1 and Y2. Then, in order to connect each of the arbitrary two magnetic elements in the magnetic element group 10 individually to the output terminal Y1 or Y2, the wires 22 and 24, for example, out of four wires 22 to 24 are cutoff. In this case, the wiring can be either electrically or physically cut off.

Figure 3:
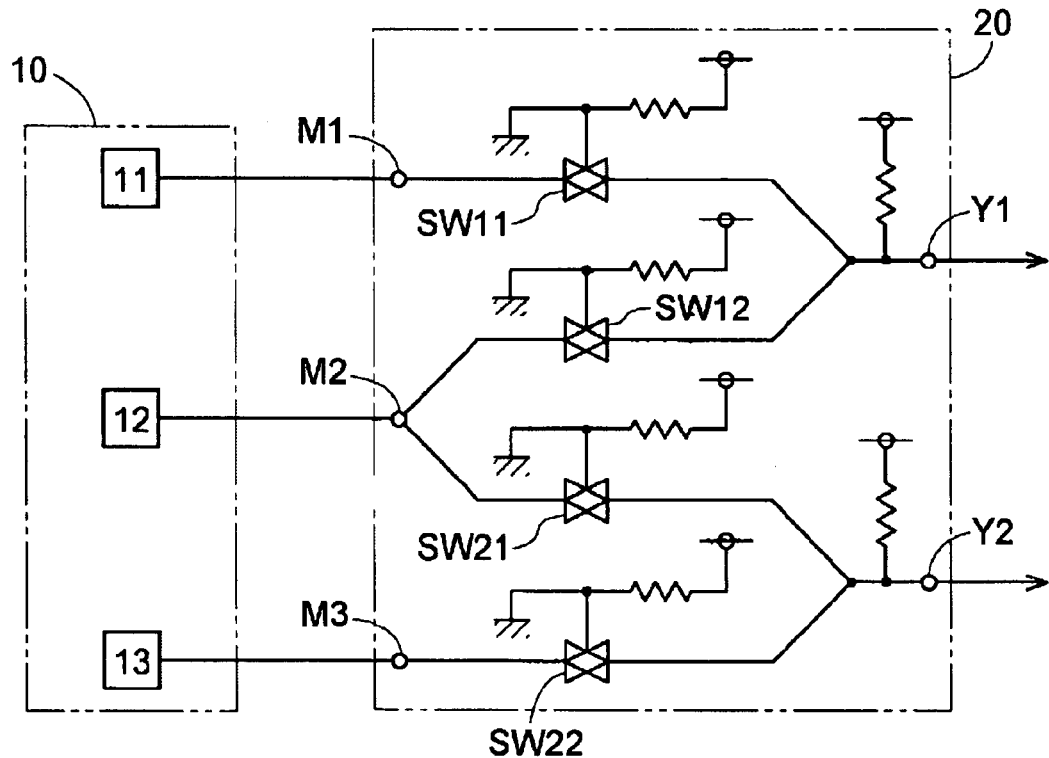
FIG. 3 is a view illustrating the rotation detecting sensor according to the embodiment of the present invention.

The present embodiment will be explained in detail with reference to FIG. 3. An output of the magnetic element 11 is applied to the output terminal Y1 by means of the monitor terminal M1 and an analog switch (hereinafter simply referred to as "switch") SW11. An output of the magnetic element 12 is divided via the monitor terminal M2 into two, one of which is applied to the output terminal Y1 by means of a switch SW12 while the other one of which is applied to the output terminal Y2 by means of a switch SW21. An output of the magnetic element 13 is applied to the output terminal Y2 by means of the monitor terminal M3 and a switch SW22.

Each analog switch according to the present embodiment is turned on when a switch signal is at a power supply level and is turned off when the switch signal is at a ground level. In an initial state, all analog switches are in OFF state since a ground side of each resistor that is connected between the power supply and the ground is connected to a control terminal of each analog switch. Accordingly, the signal is not transmitted to the output terminal Y1 or Y2, which leads to an open state of the rotation detecting sensor X, and thus a pull-up resister is connected to thereby ensure an electrical state of the rotation detecting sensor X.

Further, since the analog switches are all in OFF state, the outputs of the respective magnetic elements 11 to 13 are prevented from being short-circuited to each other by means of the output terminals Y1 and Y2. Then, the outputs from the magnetic elements 11 to 13 are confirmed by means of the monitor terminals M1 to M3, respectively, so that two magnetic elements forming the greatest differential magnetic flux therebetween can be determined.

For example, when the magnetic elements 11 and 13 are selected, the control terminal of each switch is switched so that the output of the magnetic element 11 is applied to the output terminal Y1 by means of the switch SW11 while the output of the magnetic element 13 is applied to the output terminal Y2 by means of the switch SW22.

Specifically, a wiring arranged between the resistor connected to the control terminal of the switch SW11 and the ground, and a wiring arranged between the resistor connected to the control terminal of the switch SW22 and the ground are cut off. The control terminal of the switch SW11 is pulled up to the power supply, which leads to an ON state of the switch SW11, and then the output of the magnetic element 11 is applied to the output terminal Y1. In addition, the control terminal of the switch SW22 is pulled up to the power supply, which leads to an ON state of the switch SW22, and then the output of the magnetic element 13 is applied to the output terminal Y2.

In the cases where the present embodiment is employed in an integrated circuit, a wire may be cut off through an antifuse system. In the cases where the present embodiment is achieved by mounting each part on a printed-circuit board, a wiring on the board may be cut off or a jumper wire mounted beforehand on the board may be cut off. Further, the output terminals Y1 and Y2 may be connected to an amplifier, for example, and the respective outputs from the output terminals Y1 and Y2 may be output as a single signal after a differential amplification is conducted in the amplifier. Two input portions of the amplifier connect to the two output terminals Y1 and Y2 each other. The first input portion of the amplifier connects to the output terminals Y1. The second input portion of the amplifier connects to the output terminals Y2. The first wire 21 connects to the second magnetic element 12 and the output terminals Y1. The second wire 22 connects to the first magnetic element 11 and the output terminals Y1. The third wire 23 connects to the first magnetic element 11 and the output terminals Y2. The fourth wire 24 connects to the third magnetic element 13 and the output terminals Y2. The element selector selects one of the first wire 21 and the third wire 23, the first wire 21 and the fourth wire 24, and the second wire 22 and the fourth wire 24 by cutting off the second wire 22 and the forth wire 24, the second wire 22 and the third wire 23, or the first wire 21 and the third wire 23, respectively.

According to the present embodiment, the analog switch is used. Instead, the other selecting means such as an analog multiplexer and a transfer gate may be used.

Figure 4:
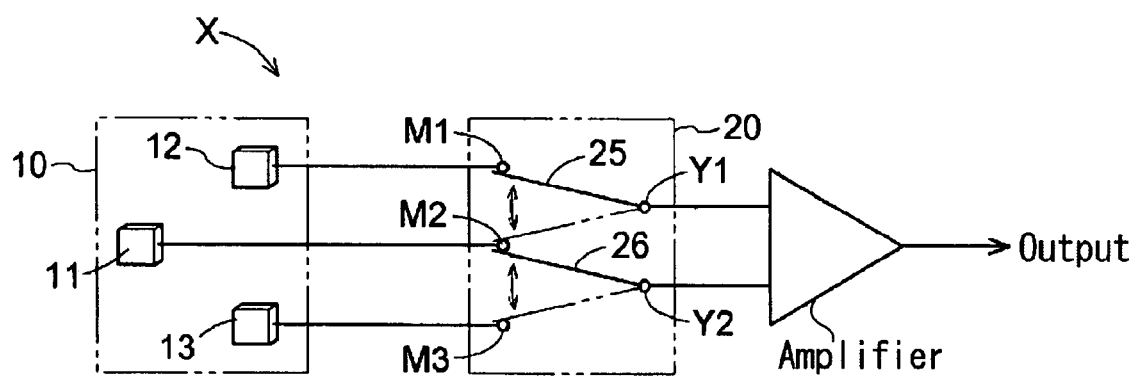
FIG. 4 is a view illustrating a rotation detecting sensor according to another embodiment of the present invention.

According to the aforementioned embodiment, the element selector 20 is constituted by the wires that can be cut off. Instead, the element selector 20 may be constituted by switch wires that are provided at two output terminals Y1 and Y2, respectively, and that can be connected to the arbitrary two magnetic elements in the magnetic element group 10 as illustrated in FIG. 4.

That is, instead of the wires 21 to 24 as illustrated in FIG. 2, switch wirings 25 and 26 such as a toggle switch and an analog multiplexer are provided between the terminals M1 to M3 and the output terminals Y1 and Y2. Then, the switch wirings 25 and 26 are individually operated so that the output terminal Y1 can be retained to be connected to one of the magnetic elements while the output terminal Y2 can be retained to be connected to the other one of the magnetic elements. At this time, in order to prevent a state where the switch wirings 25 and 26 are simultaneously connected to the terminal M2, the switch wirings 25 and 26 should be operated in conjunction with each other.

As mentioned above, the element selecting means can be constituted with a simple structure, thereby simplifying the manufacture of the rotation detecting sensor X and achieving a low cost.

The present embodiment is applicable to the rotation detecting sensor used for the engine control for a vehicle, the ABS control for a vehicle brake, and the like.

According to the aforementioned embodiment, the arbitrary pair of magnetic elements can be selected, being suitable for a specific portion where the rotation detecting sensor is mounted. For example, the pair of magnetic elements that are arranged in the closest direction along the rotation direction of the rotary member in the specific portion can be selected.

The selected pair of magnetic elements at this time can most accurately detect the rotations of the rotary body because of the large differential of the output signals among the magnetic elements. Accordingly, since the arbitrary two magnetic elements are selected out of three or more of the magnetic elements and then are connected to the output portions, the magnetic elements can be appropriately arranged in the portion where the rotation detecting sensor is mounted. As a result, it is not required to manufacture various types of rotation detecting sensors suitable for each mounting position and thus the rotation detecting sensor with the high flexibility of mounting direction can be provided.

Further, according to the aforementioned embodiment, the orientations of the selected pairs of magnetic elements in any possible cases are different from each other. Thus, the selection of the pair of magnetic elements arranged in the closest direction along the rotation direction of the rotor may support the accurate detection of the differential of the signals from respective magnetic elements.

Furthermore, according to the aforementioned embodiment, in the case of the wiring on the printed-circuit board, the arbitrary two magnetic elements can be individually connected to the respective two output portions by a cutting of a jumper wire, a removal of a zero ohm resistance mounted, or the like. In addition, in the case of the integrated circuit, the arbitrary two magnetic elements can be individually connected to respective two output portions by a cutting of a wiring by means of an antifuse, and the like. Thus, the element selecting means can be achieved by a simple structure, which may lead to a simple manufacture of the rotation detecting sensor and a low manufacturing cost.

Furthermore, according to the aforementioned embodiment, the switch wiring such as a toggle switch and an analog multiplexer on the board can achieve a switchable wiring. Thus, the element selecting means can be achieved by a simple structure, which may further lead to a simple manufacture of the rotation detecting sensor and a low manufacturing cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotation detecting sensor comprising:
    a magnetic element group including at least three magnetic elements each of which detects rotations of a rotary body that includes a magnetic body;
    output portions each for outputting a signal generated at each of the magnetic elements to an outside; and
    element selecting means for selecting arbitrary two magnetic elements from the magnetic element group and supplying the generated signal to the two output portions.

2. A rotation detecting sensor according to claim 1, wherein arbitrary three magnetic elements in the magnetic element group are arranged in a triangular shape.

3. A rotation detecting sensor according to claim 1, wherein the element selecting means includes wirings each of which is connected to at least one of the two output portions, and each wiring includes a cutable portion so that the arbitrary two magnetic elements in the magnetic element group are individually connected to the different output portions.

4. A rotation detecting sensor according to claim 2, wherein the element selecting means includes wiring each of which is connected to at least one of the two output portions, and each wiring includes a cutable portion so that the arbitrary two magnetic elements in the magnetic element group are individually connected to the different output portions.

5. A rotation detecting sensor according to claim 1, wherein the element selecting means includes switch wirings that are provided at the output portions respectively and that are connected to the arbitrary two magnetic elements respectively in the magnetic element group.

6. A rotation detecting sensor according to claim 2, wherein the element selecting means includes switch wirings that are provided at the output portions respectively and that are connected to the arbitrary two magnetic elements respectively in the magnetic element group.

7. A rotation detecting sensor comprising:
    first, second and third magnetic elements each of which detects rotations of a rotary body that includes a magnetic body;
    an amplifier including first and second input portions; and
    an element selector connected to the first, second and third magnetic elements and the first and second input portions of the amplifier and comprising a first wire, a second wire, a third wire and fourth wire,
    wherein the first wire connects to the second magnetic element and the first input portion,
    the second wire connects to the first magnetic element and the first input portion,
    the third wire connects to the first magnetic element and the second input portion,
    the fourth wire connects to the third magnetic element and the second input portion,
    the element selector selects one of the first and third wires, the first and fourth wires, and the second and fourth wires.

* * * * *